United States Patent [19]

Grace

[11] Patent Number: 5,034,258
[45] Date of Patent: Jul. 23, 1991

[54] CARPET MAT WITH IMPROVED GRIPPING SURFACE

[75] Inventor: Ronald R. Grace, Hamilton, Ohio
[73] Assignee: Nifty Products, Inc., Hamilton, Ohio
[21] Appl. No.: 468,610
[22] Filed: Jan. 22, 1990
[51] Int. Cl.⁵ .................................................. B32B 3/30
[52] U.S. Cl. ........................................ 428/78; 428/88;
428/95; 428/99; 428/120; 156/290
[58] Field of Search .................... 428/78, 88, 95, 99,
428/120; 16/4, 8; 15/217; 156/290

[56] References Cited

U.S. PATENT DOCUMENTS 4,588,628 5/1986 Roth .................................... 428/85
4,748,063 5/1988 Reuben .............................. 428/78

Primary Examiner—Alexander S. Thomas
Attorney, Agent, or Firm—Charles R. Wilson

[57] ABSTRACT

A carpet mat is produced for use on a floor carpet. The carpet mat is comprised of a carpet component with at least one gripping member of its underside. The gripping member is a thin plate having a first set of vertically extending protrusions which extend into a fibrous portion of the carpet component. Substantially all the tips of the protrusions are distorted in a random fashion to interlock with the fibrous portion of the carpet component to cause a permanent attachment thereto. A second set of vertically extending protrusions extend from an opposite side of the thin plate and are for the purpose of interacting with the floor carpet to prevent a shifting of the carpet mat when placed onto the floor carpet.

20 Claims, 2 Drawing Sheets

CARPET MAT WITH IMPROVED GRIPPING SURFACE

This invention relates to a carpet mat. More particularly, the invention relates to a carpet mat with an improved gripping member on its underside for retaining a position on an underlying carpet.

BACKGROUND OF THE INVENTION

Carpets are found in the home, commercial establishments, and motor vehicles such as automobiles, vans and even some trucks. The carpet provides a pleasing appearance, but also adds comfort, warmth and improved acoustic characteristics. It can be subjected to constant foot traffic. It is quite usual for a small area of the carpet to receive substantially more wear and tear than other areas. For instance, a carpeted room in a house will usually have a certain traffic pattern depending on where doors and other entrance ways are located. A hallway will receive much more traffic than an edge of a room away from doors and windows. Rooms and hallways in commercial establishments also will have certain established traffic patterns. Carpets in motor vehicles will have developed a localized heavy usage also, particularly in the foot well of the driver's side of the vehicle.

It is possible to even-out wear on a carpet by rotating it or even shifting its room locale if feasible. Wall to wall carpet and motor vehicle carpet, however, are permanently installed in one position. When one area of the carpet shows excessive wear and tear, it is necessary to discard the whole carpet.

Carpet mats of various shapes have been designed to provide a measure of protection to those areas of an underlying carpet which receive the most traffic. Thus, floor runners have been used in hallways. Foot mats have been used near an outside door. Car mats have been used for placement in the vehicle's front foot wells and even in the rear foot wells. The mats are typically made of a low quality carpet material which is itself discarded and replaced when necessary.

A problem inherent with a carpet mat used on a carpet is its tendency to slip. A carpet mat often has a smooth backing. The carpet will have a fibrous surface. The smooth backing of the mat on the fibrous surface of the carpet is very conducive to slippage during use. The problem is well recognized. Different solutions have been used. For instance, a mat with a roughened back side has been used. A mat with a low slip backing such as a foam layer has been used. Double-sided carpet tapes have also been used.

One carpet mat which has met with limited success has a backing with a set of vertically extending protrusions. The protrusions extend into the fibrous portion of the carpet being protected. They physically interact to prevent the mat from moving in a lateral direction. A particular problem with this type of gripping member is the initial positioning of the protrusions on the mat's underside. If the mat has a heavy plastic backing, the protrusions are simply included in the backing's mold design. This represents an added cost. Additionally, many carpet mats of various qualities are designed without a plastic backing and necessarily present no economical means for inclusion of the protrusions.

There has now been developed a carpet mat with an improved gripping member on its underside. The carpet mat of the invention is produced in an economical fashion without extensive capital costs or labor needs. The mat is capable of retaining its position when used on different carpets without damaging the carpet.

SUMMARY OF THE INVENTION

A carpet mat is comprised of a carpet component with a fibrous portion and at least one gripping member permanently positioned on the carpet component's underside. The gripping member is a thin plate having on one side a first set of vertically extending protrusions which extend into the fibrous backing and having on an opposite side a second set of vertically extending protrusions. The first set of protrusions has substantially all its tips distorted in a random fashion to interlock with the fibrous portion. The second set of protrusions interact with the floor carpet when placed thereon to prevent a shifting.

DETAILED DESCRIPTION OF THE INVENTION

Figure 1:
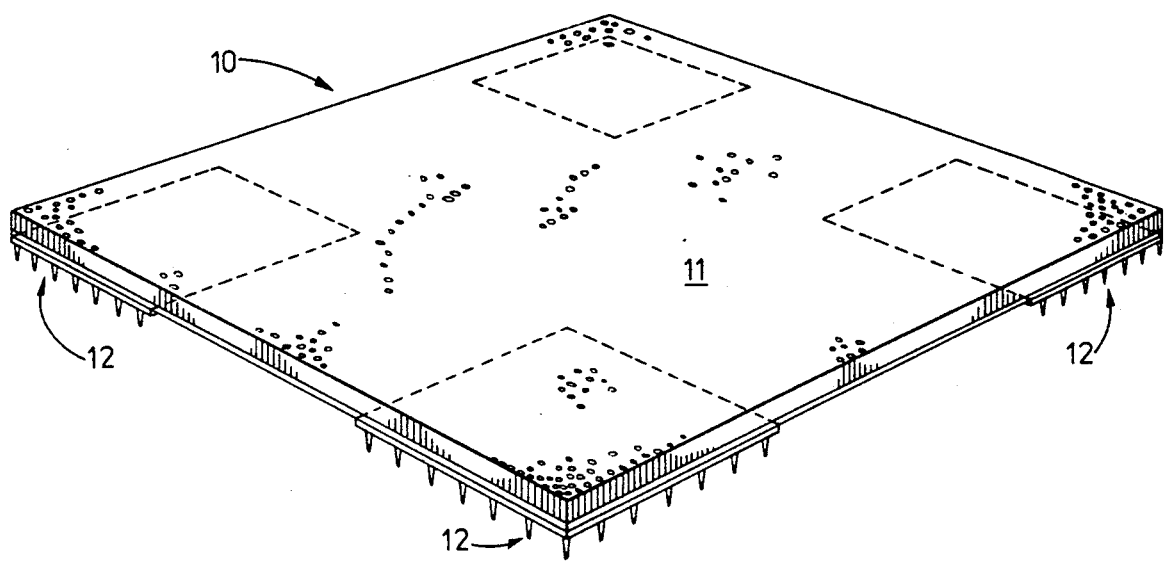
FIG. 1 is a view in perspective showing a carpet mat of this invention.

With reference to the drawings, there is shown in FIG. 1 a carpet mat 10 of this invention intended for use as an inside door mat. The invention will be described with particularity for this use. Such a mat is generally about one foot to about six feet in length and about one foot to about three feet in width. It should be readily apparent a carpet mat of different shapes and dimensions would have use on other carpeted floor surfaces, such as in the home, office or motor vehicle.

Figure 3:
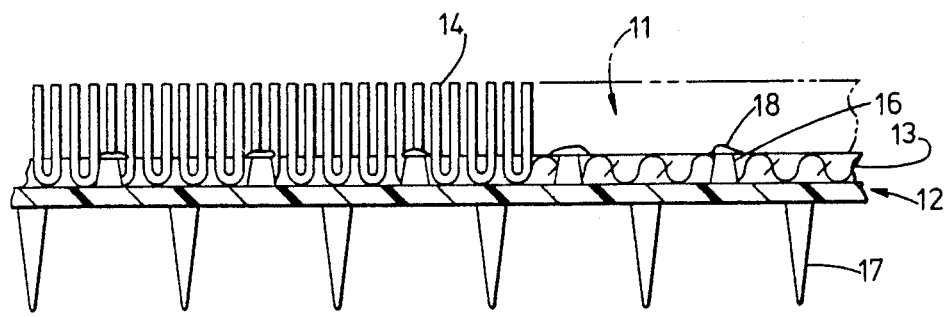
FIG. 3 is a partial side view in section of the carpet mat of FIG. 1 showing in detail one gripping member.

The carpet mat 10 is comprised of a tufted carpet component 11 and gripping members 12. Specifically, as best seen in FIG. 3, the tufted carpet component 11 includes a woven fabric backing 13 and pile yarns 14 which are secured to the backing and extend therefrom to form a pile surface on its upperside. The pile yarns may be made from natural material such as wool, but more often is made from a synthetic material such as polyester or nylon. A binder coating (not shown) is used to adhere and lock the pile yarns into the backing. Other carpet constructions including woven, knitted or non-woven constructions of a one-piece or composite design can be used in this invention. Any carpet construction having a fibrous portion whether as a backing, a mid-portion or the total carpet is useful herein.

Figure 2:
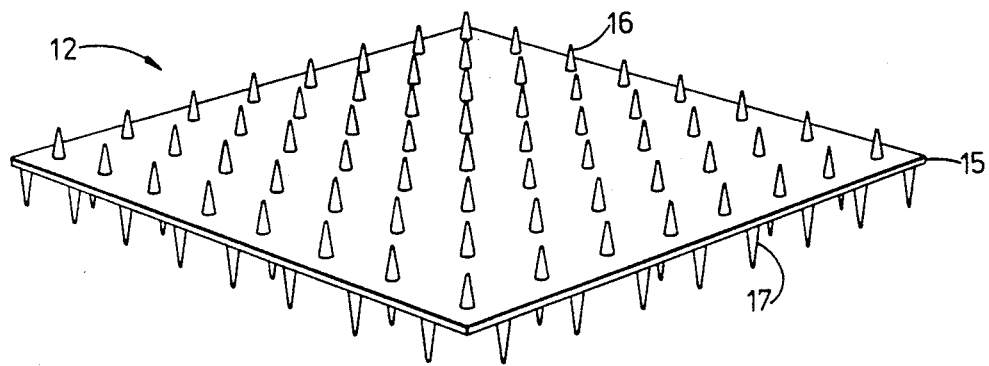
FIG. 2 is a view in perspective showing a gripping member prior to its attachment to a carpet component.

In accord with this invention a gripping member is permanently attached to the underside of the carpet component. For purposes of fully understanding the invention the gripping member 12 is shown in FIG. 2 before its attachment to the carpet component and consequent structural changes. The gripping member 12 is a thin plate 15 of a polymeric material having sets of vertically extending protrusions on each side. One set of protrusions 16 is used to permanently hold the gripping member to the carpet component while the second set of protrusions 17 is used to hold the carpet mat in position when placed on a floor carpet. The size of the gripping member is not critical. It can have a length and width sufficient to substantially cover the carpet component's underside. Maximum holding power would be attained in this instance, though is more than is needed under normal use circumstances. Preferably, small carpet mats such as the mat 10 of FIG. 1 use gripping members 12 ranging in size from about five inches to about ten inches in length and width near each corner. Carpet mats such as a hallway runner will use a series of similarly shaped and dimensioned gripping members placed strategically in the corners and along the edges of the runner's underside. A small carpet mat will require only one gripping member position in an approximate center location.

The first set of vertically extending protrusions 16 on the gripping member 12 covers one surface. They are preferably uniformly spaced over the surface to provide about one to about forty protrusions per square inch, preferably about five to about fifteen protrusions per square inch. Each protrusion is about one-eighth to about one-half inches in length, preferably about one-eighth to about one-fourth inches in length before any distortion when attached to the carpet mat. The protrusions 16 are conical-shaped, though other shapes can be used.

After the gripping member is attached to the carpet component, and as best seen in FIG. 3, the protrusions 16 are distorted at their tips 18 in a random fashion. Some of the protrusions are bent in essentially right angles to the base portions of the protrusions while other tips are "mushroomed". The random distortions of the tips are responsible for the permanent attachment of the gripping member to the carpet component. The protrusion tips interlock with the component's fabric backing so that vertical as well as lateral forces in any direction will be resisted by several protrusion tips which are bent in the same direction as the force and thus are locked against a part of the fabric backing.

The second set of vertically extending protrusions 17 cover the opposite side of the gripping member 12. They too, are preferably uniformly spaced over the surface to provide about one to about forty protrusions per square inch, preferably about one to about thirty protrusions per square inch. The protrusions are about oneeighth to about three-eighths inches in length, preferably about one-eighth to about one-fourth inches in length. These protrusions are used to interact with an underlying floor carpet to prevent shifting of the mat when placed thereon. The protrusions are conical-shaped for best structural strength and holding power. They can as well be peg-shaped or any of several other shapes, though such shapes provide no real advantage and are less preferred.

The gripping member used in this invention is preferably produced from a thermoplastic polymeric material by conventional molding techniques. Initially, the gripping member is positioned on the underside of the carpet component where it is to be permanently attached. The tips of the first set of protrusions extend into the fibrous portion of the carpet component a sufficient distance that when they are ultimately distorted, the bent tips will interlock with the fibrous material. The exact distance will be based on the particular carpet, protrusion length and degree of distortion. Routine experimentation will readily determine the proper extension for optimum gripping member retention.

A force is applied to the first set of vertically extending protrusions to cause their tips' distortions. For this purpose, a hydraulic press is preferably provided. A stationary platen has a set of receiving holes to match the second set of protrusions extending from the gripping member. A force platen mounted in the press directly above the stationary platen has a flat surface. The carpet component with the gripping member temporarily in position is placed in the press. The second set of vertically extending protrusions are fitted into the receiving holes in the stationary platen to ensure that no force is exerted on them. The upper flat force platen is caused to contact the carpet component with sufficient force that the tips of the first set of vertically extending protrusions are forced downwardly. The tips will distort in a random set of directions depending on a number of factors such as force deflections, uneven platen surface, uneven initial protrusion tilt, etc.

The degree of force needed in the press is determined by routine experimentation. Too little force will not give the requisite degree of distortion with a resultant carpet mat wherein the gripping member is not securely attached. Too great a force will cause all the protrusions to mushroom and, here also, the resultant carpet mat's gripping member may not be able to withstand lateral forces in all directions without being dislodged from the fabric backing of the carpet component. Excessive force during this stage of manufacture can, of course, also damage the carpet component.

As should be apparent, the carpet mat of this invention can be economically produced. The gripping member is inexpensive and the equipment needed to secure attachment to the carpet component is not excessively great. Additionally, assembly of the carpet mat is not labor intensive.

Figure 4:
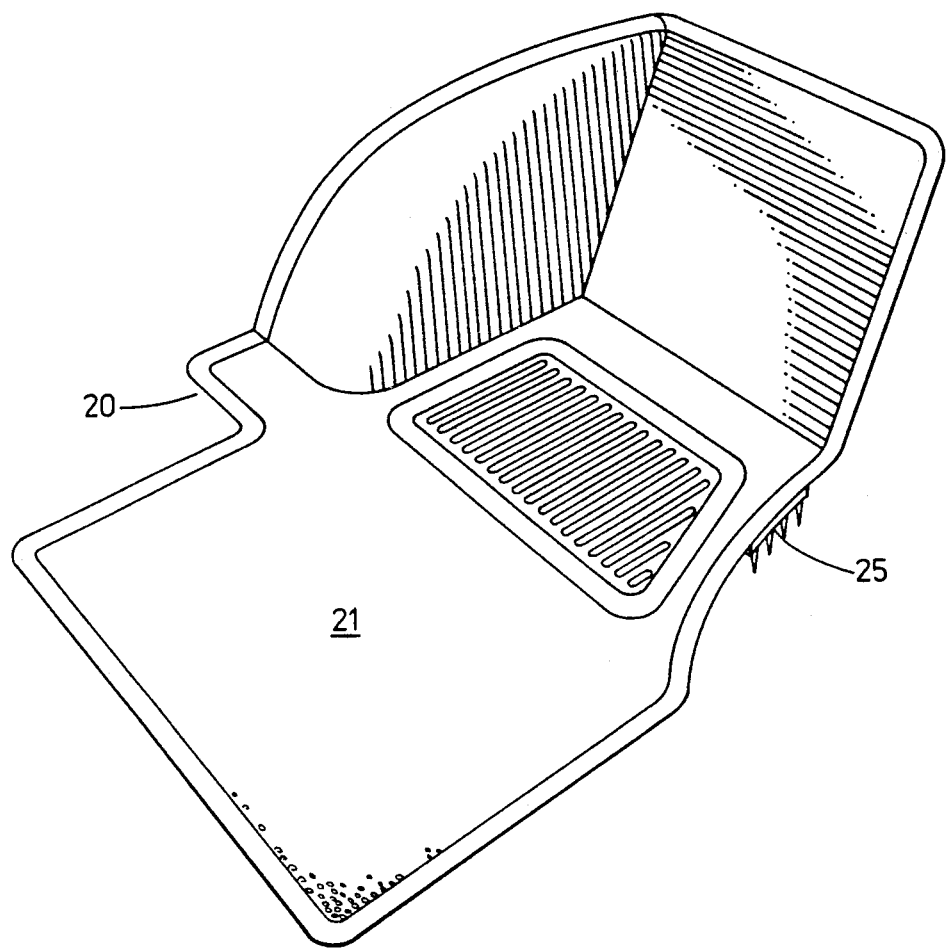
FIG. 4 is a view in perspective of a molded carpet mat of this invention.
Figure 5:
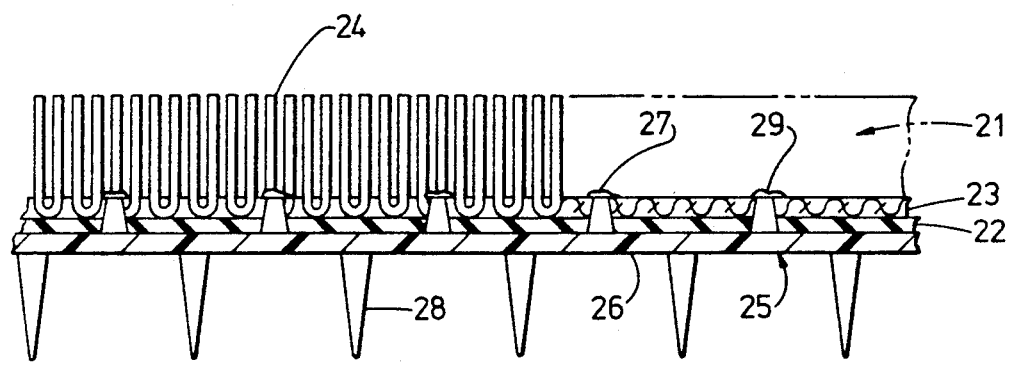
FIG. 5 is a partial side view in section of the carpet mat of FIG. 4 showing in detail a gripping member.

FIGS. 4 and 5 show a molded carpet mat 20 intended for use in an automobile. The mat uses a tufted carpet component 21 with a plastic layer 22 underside. The tufted carpet has a fabric backing 23 and pile yarns 24. The tufted carpet component of the nat is the same as used with the mat described with reference to FIGS. 1 and 2. The plastic layer 23 covering the underside of tufted carpet component 21 is a thermoplastic material. The layer is adhered firmly to the fabric backing 23 and covers the entire surface. The primary function of the thermoplastic layer is to impart stiffness and moldability to the carpet component so that it can be molded to a desired contour designed to fit a particular vehicle's foot well area. Examples of suitable thermoplastics include polymers of ethylene and propylene, copolymers of ethylene with ethylenically unsaturated monomers, e.g. ethylenevinyl acetate, acrylates, polyvinyl chlorides and styrene-butadiene polymers. The thermoplastic layer will cause the carpet component to retain its contour throughout its useful life. The layer is added to the fabric backing by extrusion coating or laminating in known fashion.

Carpet mat 20 covers only a portion of the automobile's carpeted floor area. However, the driver's foot well receives by far the most wear and accordingly will be the first area to show any wear or soiling. The carpet mat 20 itself is shaped to smoothly fit into the irregular-shaped foot well.

A single gripping member 25 is permanently attached to the underside of plastic layer 22 of the tufted carpet component. It is positioned in the approximate center of the mat and extends from edge to edge. Additional gripping members can as well be placed in other areas, e.g. the sloped foot rest area for added stability. The gripping member 25 is of the same construction as that used on the carpet mat 10 of FIG. 1. It comprises a thin plate 26 with a first set of vertically extending protrusions 27 on one side and a second set of vertically extending protrusions 28 on an opposite side. The protrusions 27 extend through the thermoplastic layer with their distorted tips 29 interlocking with the fabric backing of the carpet component.

In use, the carpet mat is simply placed on the floor carpet to be protected and a slight downward pressure exerted to cause the protrusions on the underside of the gripping member to interact with the floor carpet. The carpet mat will remain in place under normal use. The unique gripping member remains permanently attached to the carpet component due to the first set of vertically extending protrusions and remains in place on the floor carpet due to the second set of vertically extending protrusions. In due course, the carpet mat is readily removed simply by lifting it vertically from the carpet. The underlying carpet is not damaged to any noticeable degree.

The invention has been described with particularity and with reference to the drawings. Obvious variations and modifications can be made. Such changes are within the scope of the appended claims.

What is claimed:

1. A carpet mat intended for overlayment on a floor carpet, comprising:
   (a) a carpet component having a fibrous portion; and
   (b) at least one gripping member permanently positioned on the underside of the carpet component, said gripping member being a thin plate having on one side a first set of vertically extending protrusions which extend into the fibrous portion of the carpet component with substantially all tips of the protrusions distorted in a random fashion to interlock with the fibrous portion so as to cause a permanent attachment thereto and having on an opposite side a second set of vertically extending protrusions which interact with the floor carpet to prevent shifting of the carpet mat when placed thereon.

2. The carpet mat of claim 1 wherein the vertically extending protrusions on the plate are uniformly spaced on each side of the plate.

3. The carpet mat of claim 2 wherein the first set of vertically extending protrusions are spaced to provide from about one to about forty protrusions per square inch and the second set of vertically extending protrusions are spaced to provide about one to about forty protrusions per square inch.

4. The carpet mat of claim 3 wherein each protrusion of the first set of vertically extending protrusions is from about oneeighth inches to about one-half inches in length.

5. The carpet mat of claim 4 wherein each protrusion of the second set of vertically extending protrusions is from about oneeighth inches to about three-eights inches in length.

6. The carpet mat of claim 5 wherein each protrusion of the first set of vertically extending protrusions is from about oneeighth inches to about one-fourth inches in length and each protrusion of the second set of vertically extending protrusions is from about one-eighth inches to about one-fourth inches in length.

7. The carpet mat of claim 5 wherein the second set of vertically extending protrusions are conical-shaped.

8. The carpet mat of claim 6 wherein the gripping member is formed from a polymeric material.

9. The carpet mat of claim 6 wherein a set of gripping members are placed around the periphery of the carpet component's underside.

10. The carpet mat of claim 9 wherein the carpet mat ranges from about one foot to about six feet in length and about one foot to about three feet in width.

11. The carpet mat of claim 1 wherein the carpet component is a tufted carpet having a fabric backing and pile yarns extending therefrom.

12. The carpet mat of claim 11 wherein the carpet component further has a thermoplastic layer covering the fabric backing.

13. The carpet mat of claim 12 wherein the carpet mat is contoured to fit a foot well of a motor vehicle.

14. The carpet mat of claim 1 wherein the carpet component is a one-piece non-woven fibrous material.

15. The method of claim 1 wherein the carpet component is a one-piece non-woven fibrous material.

16. A method of producing a carpet mat for overlayment on a carpet, comprising the steps of:
   (a) positioning a gripping member on the underside of a carpet component having a fibrous portion, said gripping member comprised of a thin plate having a first set of vertically extending protrusions and having on an opposite side a second set of vertically extending protrusions;
   (b) placing the carpet component with the gripping member positioned on its underside in a press wherein the press has a stationary platen with receiving holes to receive the second set of vertically extending protrusions to prevent a force being transmitted thereto and an oppositely positioned force platen; and
   (c) forcing the platens of the press together under sufficient force that the first set of vertically extending protrusions are distorted in a random fashion to interlock with the fibrous portion of the carpet component so as to produce the carpet mat.

17. The method of claim 16 wherein the vertically extending protrusions on the gripping member are uniformly spaced on each side thereof.

18. The method of claim 17 wherein the first set of vertically extending protrusions are spaced to provide from about one to about forty protrusions per square inch and the second set of vertically extending protrusions are spaced to provide about one to about forty protrusions per square inch.

19. The method of claim 18 wherein each protrusion of the first set of vertically extending protrusions is from about one-eighth inches to about one-half inches in length and each protrusion of the second set of vertically extending protrusions is from about one-eighth inches to about three-eights inches in length.

20. The method of claim 16 wherein the carpet component is a tufted carpet having a fabric backing and pile yarns extending therefrom.

* * * * *